United States Patent
Urbanik et al.

(10) Patent No.: US 8,942,371 B2
(45) Date of Patent: Jan. 27, 2015

(54) METHOD AND SYSTEM FOR A SYMMETRIC BLOCK CIPHER USING A PLURALITY OF SYMMETRIC ALGORITHMS

(76) Inventors: Jerzy Henryk Urbanik, Astoria, NY (US); Przemyslaw Bartlomiej Bezeg, Bochnia (PL)

( * ) Notice: Subject to any disclaimer, the term of this patent is extended or adjusted under 35 U.S.C. 154(b) by 471 days.

(21) Appl. No.: 12/807,186

(22) Filed: Aug. 30, 2010

(65) Prior Publication Data

US 2011/0069834 A1   Mar. 24, 2011

Related U.S. Application Data

(60) Provisional application No. 61/275,836, filed on Sep. 3, 2009.

(51) Int. Cl.
*H04L 29/06* (2006.01)
*H04L 9/06* (2006.01)
*H04L 9/14* (2006.01)

(52) U.S. Cl.
CPC .......... *H04L 9/0618* (2013.01); *H04L 9/0637* (2013.01); *H04L 63/045* (2013.01); *H04L 9/14* (2013.01)
USPC ............... 380/28; 380/29; 380/37; 380/42; 380/277; 380/259; 713/189

(58) Field of Classification Search
CPC ............. H04L 9/14; H04L 9/068; H04L 9/00; H04L 9/18; H04L 9/08; H04L 9/32; H04L 9/002; H04L 9/0618; G06Q 20/382; G06F 21/72
USPC .......................................................... 380/28
See application file for complete search history.

(56) References Cited

U.S. PATENT DOCUMENTS 6,185,304 B1 * 2/2001 Coppersmith et al. .......... 380/37
2004/0255129 A1 * 12/2004 Henry et al. ................... 713/189

OTHER PUBLICATIONS

Cook, Debra, Angelos Keromytis, and Moti Yung. "Elastic Block Ciphers: The Basic Design." ASIACCS'07, Mar. 20-22, 2007, Singapore.*

* cited by examiner

*Primary Examiner* — Taghi Arani
*Assistant Examiner* — Narciso Victoria
(74) *Attorney, Agent, or Firm* — Richard B. Klar; Law Office Richard B Klar

(57) ABSTRACT

A method and system for hybrid encryption wherein all of the round function variables including the encryption algorithm change for each round. This permits the generation of block sizes and key sizes of any length and use standard block sizes and key sizes for the respective symmetric algorithm for each round function.

14 Claims, 6 Drawing Sheets

Schema of work of hybrid algorithm

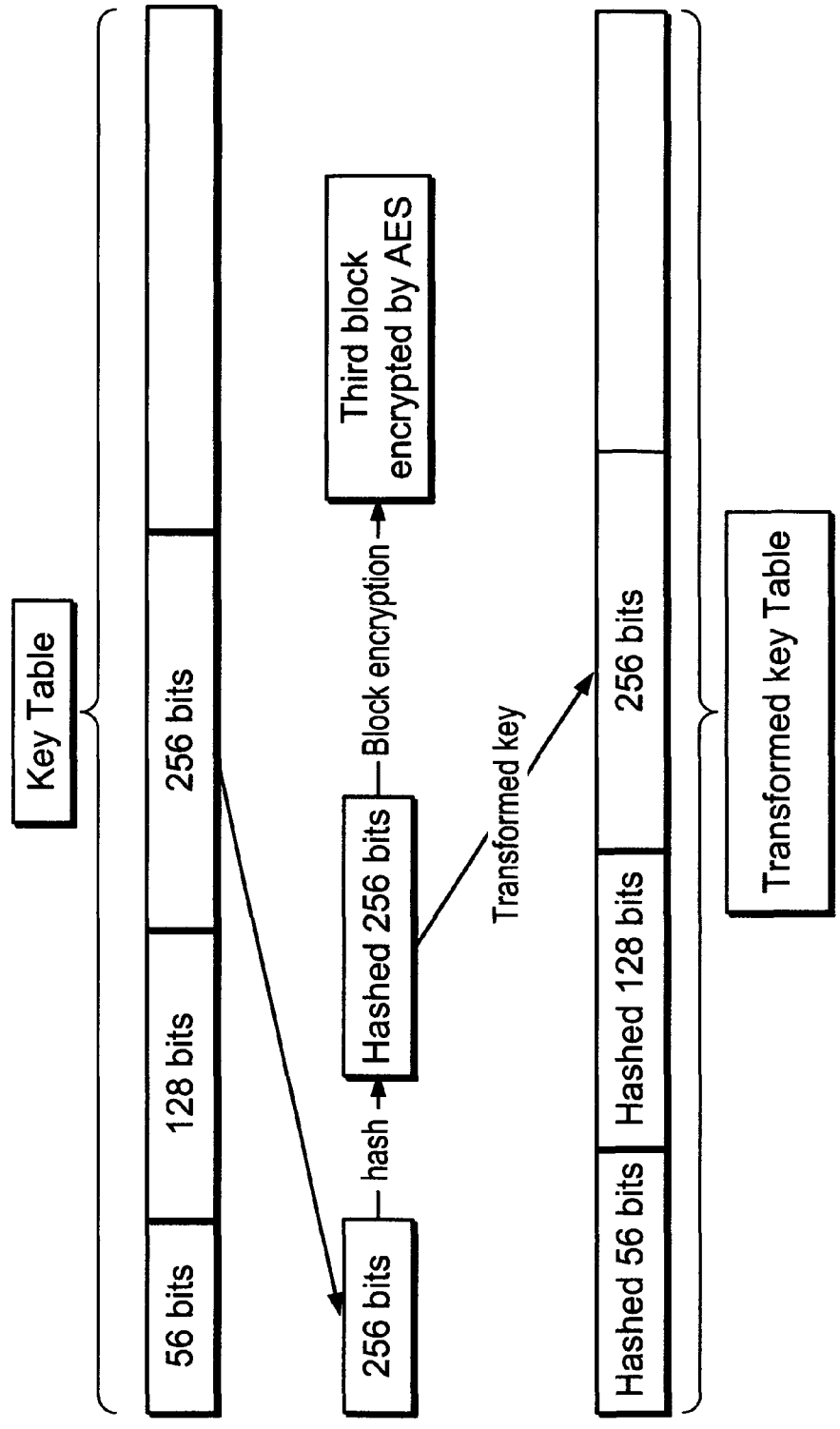

METHOD AND SYSTEM FOR A SYMMETRIC BLOCK CIPHER USING A PLURALITY OF SYMMETRIC ALGORITHMS

RELATED APPLICATIONS

The present application is a nonprovisional application of provisional application Serial No. 61/275,836 filed Sep. 3, 2009 by Jerzy Henryk and Przemyslaw Bartlomiej.

BACKGROUND

1. Field

The present disclosure relates to a method and system for cryptography and relates more specifically to a system and method for a symmetric key block cipher. The present disclosure employs multiple symmetric algorithms, variable block sizes, multiple hash functions, and different key lengths. The present disclosure permits a change in the block size, key size, and algorithms for each encrypted block. In this way the encrypted blocks are better protected against unauthorized deciphering.

2. Description of the Related Art

Data encryption systems are well known in the data processing art. Encryption systems fall into two general categories: symmetric (or secret key) and asymmetric (or public key). Symmetric systems use the same secret key for performing the encryption operation and for the decryption operation. One of the best know symmetric encryption algorithms is the Data Encryption Algorithm (DEA) that implements the Data Encryption Standard (DES) as defined by the National Institute of Standards and Technology publications "Data Encryption Standard (DES)", FIPS PUB 46-2 (1980) and "DES Modes of Operation", FIOS PUB 81 (1988). In general, such encryption systems operate by using a fixed-length key, performing an encryption operation on a plaintext input block, and produce a ciphertext output block. The receiver of an encrypted message performs a corresponding decryption operation, using the same secret key for decryption, to recover the plaintext block. The DES encryption system utilizes a 56-bit key plus 8 bits for parity checking and the encryption block size is 64-bits.

Asymmetric (or public-key) encryption systems use key pairs, consisting of a private key and a corresponding public key that are not feasibly derivable from one another for encryption and decryption. The public key is the encryption key while the private key is the decryption key and is kept secret. Anyone wishing to send an encrypted message uses the receiver's public key to encrypt a message. Only the receiver will be able to decrypt the message since they are the only one with the corresponding private key. One of the best known asymmetric algorithms is the RSA encryption system named after its inventors Rivest, Shamir, and Adleman.

Symmetric encryption systems possess a similar characteristic which is that they repeatedly perform the same sequence of operations on plaintext input blocks. This technique is referred to as round functions with the algorithms gaining strength by performing the same sequence of operations numerous times.

While there many methods of symmetric key block encryption systems, the most popular methods (for example, DES, CAST, RC5, and Blowfish) are based on Type-2 Fiestel Networks. This scheme consists of dividing the data to be encrypted into two halves and then executing a number of pre-determined rounds, where each round consists of transforming the left half of the data based on the right half of the data and then transforming the right half based on the transformed left half. These transformations are called sub-rounds and are invertible. Different Fiestel network schemes can divide data into unequal parts or several equal sizes. Effectively, with such symmetric encryption schemes, they share the common characteristic of performing the same fixed operations on blocks of data during the entire encryption operation. The symmetric encryption systems mentioned here differ based on the specific functions that are performed within each round function. The specific operations are chosen for speed and strength features.

In view of the above, symmetric encryption systems gain strength by increasing the number of rounds or by increasing the key length. Another way to increase the strength of a symmetric encryption system is to increase the block size. Increasing or varying key sizes and increasing or varying block sizes are two methods that can be used to increase strength and cryptanalysis more difficult. It will be appreciated that when a symmetric encryption system allows varying key sizes and block sizes at the same time, it presents an extremely difficult challenge to anyone attempting to discover the original data from the encrypted result. Existing symmetric key bock algorithms may provide for varying key sizes, block sizes, and the number or rounds, however, these algorithms define a single type of round function and use the function repeatedly.

The present disclosure adds another dimension to symmetric encryption systems, increasing the difficulty and challenge to anyone attempting to discover the original encrypted data from the encrypted result by adding a new variable to the encryption process. The new variable is that instead of using a single type of round function, the present disclosure uses different symmetric algorithms for each round function. The present disclosure varies key sizes, block sizes, and symmetric algorithms to provide additional difficulty and challenge to potential attackers.

BRIEF DESCRIPTION OF THE DRAWINGS

FIGS. 3a, 3b and 3c are flowcharts illustrating the steps in the creation of keys used in a process of encryption for an algorithm in accordance with the present disclosure.

SUMMARY

Figure 3A:
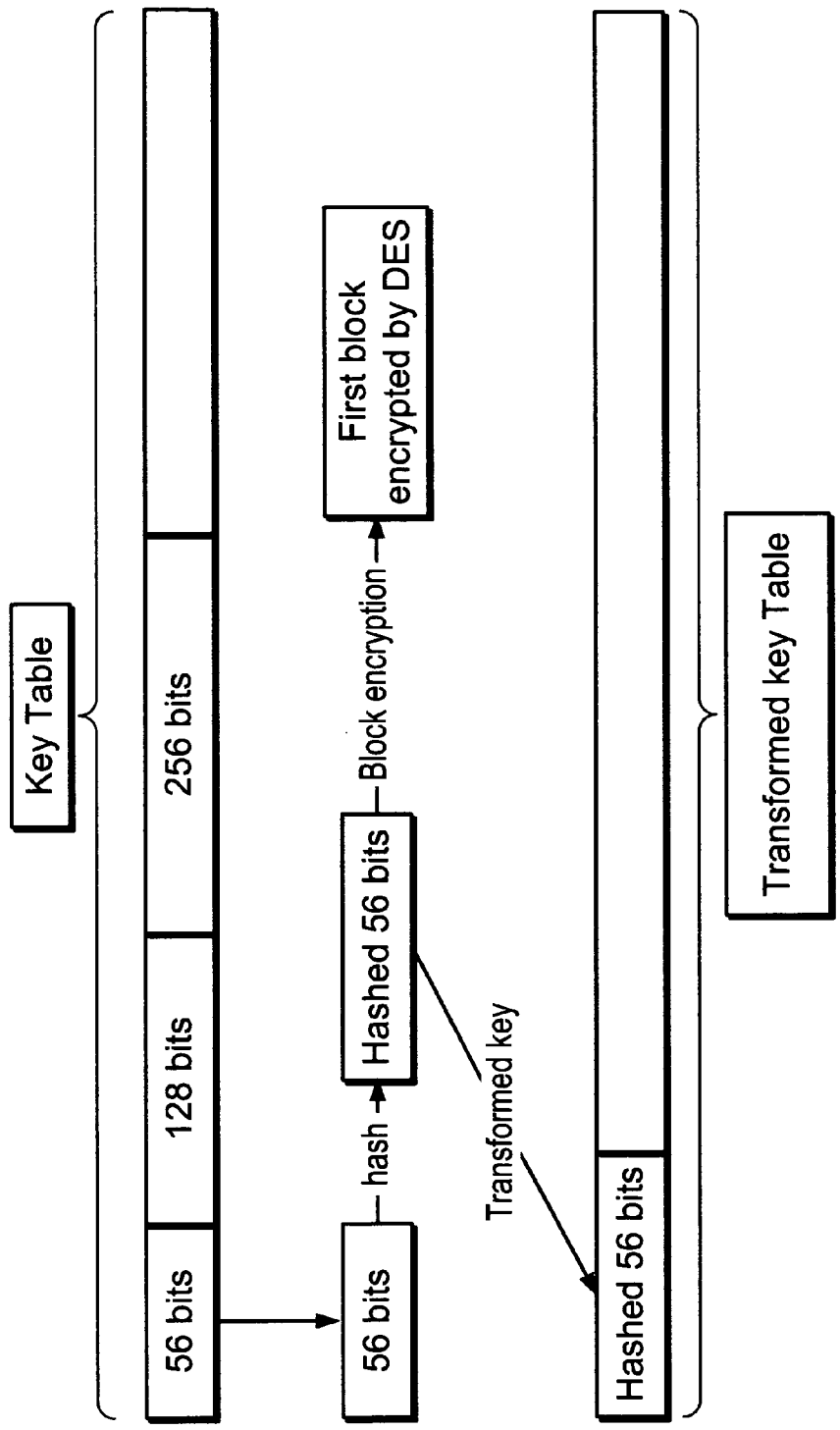

The present disclosure describes a novel symmetric encryption method and system for encrypting data using a plurality of existing symmetric encryption algorithms, variable key sizes, and variable block sizes. The present disclosure provides a technique whereby data that is encrypted according to the present disclosure cannot be decrypted other than using the corresponding decryption technique of the present disclosure as use of any other decryption techniques will be computationally infeasible. The present disclosure employs the use of a hash function. A hash function is any well defined procedure or mathematical function which converts a large, possibly variable sized amount of data into a small datum, typically a single integer to serve as an index in an array. The values are returned by a hash function and are called hash values, has codes, hash sums or simply hashes. A hash function is also used as in cryptology as a one way crypting key function. Three examples of key hashing are shown in FIGS. 3*a* (starting with DES algorithm),3*b* (using subsequent TDES algorithm)and 3*c* (using subsequent AES algorithm).

In view of the discussion of symmetric encryption systems described above where symmetric systems used fixed round functions, the present disclosure changes the round function at each iteration of encryption of a plaintext block, thereby changing the key size, the block size, and the encryption algorithm itself for each round function. The key size, the block size, and the encryption algorithm are algorithmically selected for each round and are not pre-determined. The present disclosure uses the following procedure to encrypt information:

1. A password or encryption key is provided and initiates the encryption process
    The password or key (preferred value of 65000 or more) are created using Random Number Generator or any other method and placed into a table.
2. A series of encryption keys are extracted from the 65000 bit value, extracting the required key length for particular symmetric algorithm being used.
3. Each key is used once and only once
4. Each extracted key is hashed again and the required bits are used for the encryption process, for example, 56 bits for DES, 112 for TDES, 128 or 256 for AES, etc.
    a. The selected key bits can be the first sequential bits of the hash value, for example, first 256 bits for an AES key of a SHA-2 320-bit output value or the bits can be chosen in a different sequence.
    b. Additionally, the resulting hash output is parsed and selected key bits are used to select the:
        i. Symmetric encryption algorithm
        ii. Block size (length)
        iii. Hash function
        iv. Mode of operation
        v. Method of operation
        vi. Random number generator values
    c. The key is placed back into the table and overrides its location; it will be hashed again prior to any encryption use, if necessary.
5. New keys are generated for each round until the encryption process ends using this process.

The present disclosure increases the difficulty of cryptanalysis since all the parameters are changing during each round function. The object is to increase the difficulty of decrypting information by increasing the work effort so it is computationally infeasible to decrypt the ciphertext. This objective has been achieved by implementing a system where all of the encryption round function variables, including the encryption algorithm itself, changes for each round. The present disclosure allows for block sizes and key sizes of any length to be generated and used, however, for the preferred embodiment of the present disclosure the encryption process described uses standard block sizes and key sizes for the respective symmetric algorithm being used, for each round function.

Key length is a number of bits that are used an encryption of one block of data. The block size is a number of bits which can be encrypted by an encryption algorithm during one cycle. Thus for example a DES industry standard is: a key length of 56 bits and a block size of 64 bits. For the latest industry standard AES the key length may be 128 bits and the block size may be 128 bits. If one of these two criterion is different than a standard than what is being employed is a non-standard block size and key size. DES is the Data Encryption Standard (DES) that is a block cipher (a form of shared secret encryption) that was elected by the National bureau of Standards as an official Federal Information processing Standard (FIPS) for the United States in 1976 has been well received internationally. DES is based on a symmetric-key algorithm using a 56 bit key.

It is understood that the present disclosure is not limited to standard block sizes and key sizes for a respective symmetric algorithm for a round function and this is just an illustrative non-limiting example of the present disclosure.

DETAILED DESCRIPTION OF THE PREFERRED EMBODIMENT(S)

Figure 1:
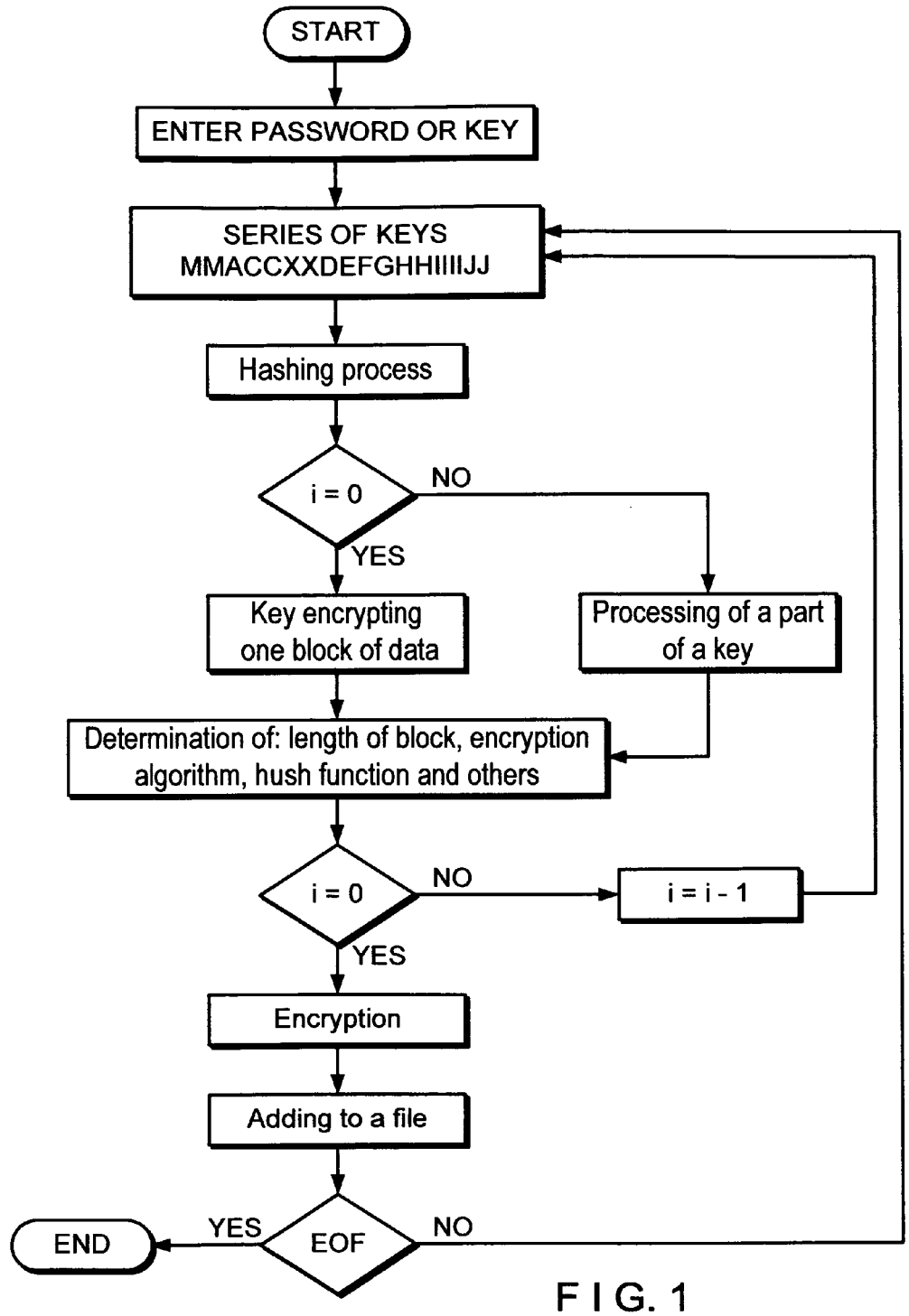
FIG. 1 is a flowchart illustrating the general operation of the present disclosure for one round of a hybrid algorithm disclosure.
Figure 2A:
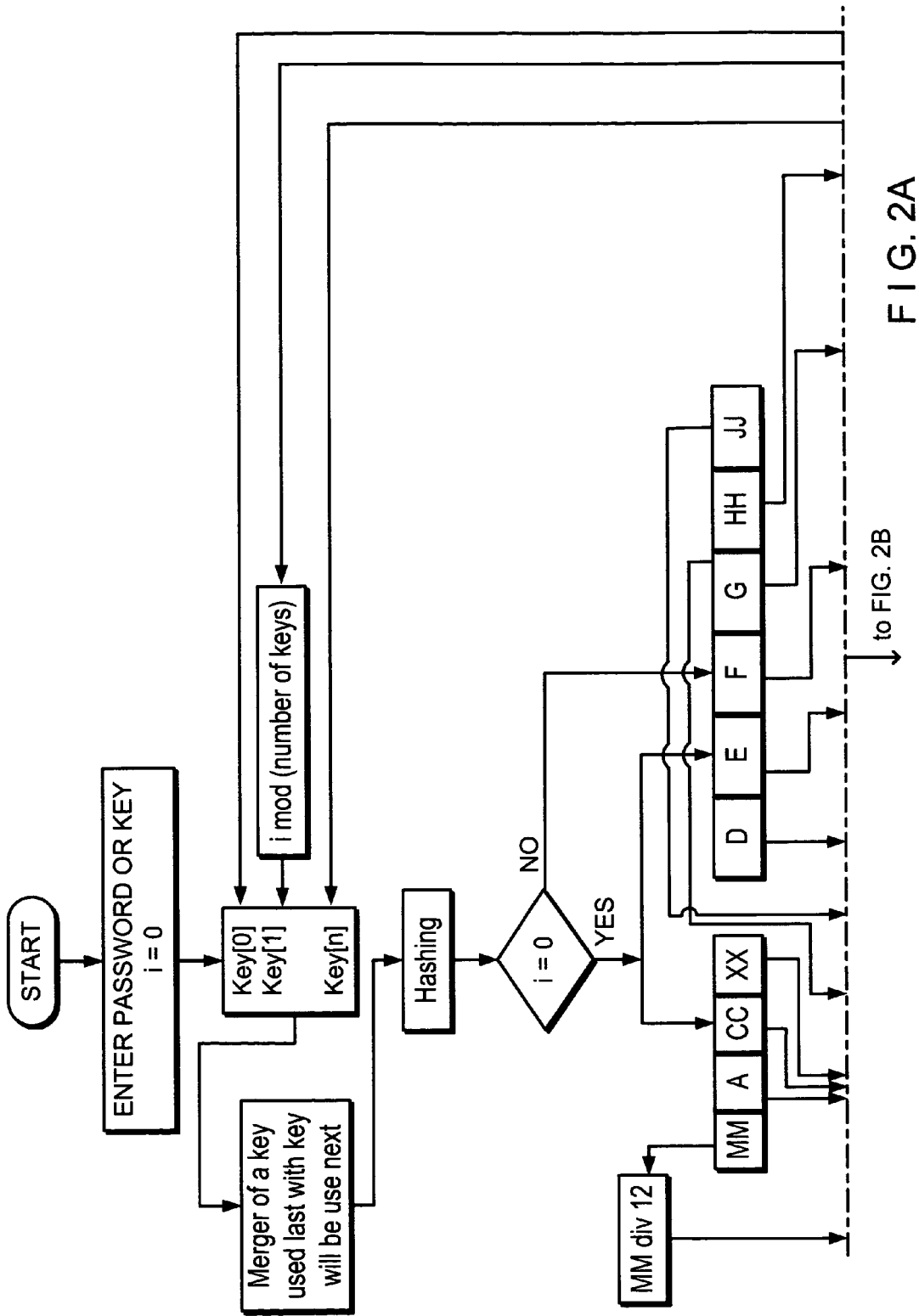
FIG. 2 is a detailed flowchart of an embodiment of the present disclosure for the operation of a hybrid algorithm.
Figure 2B:
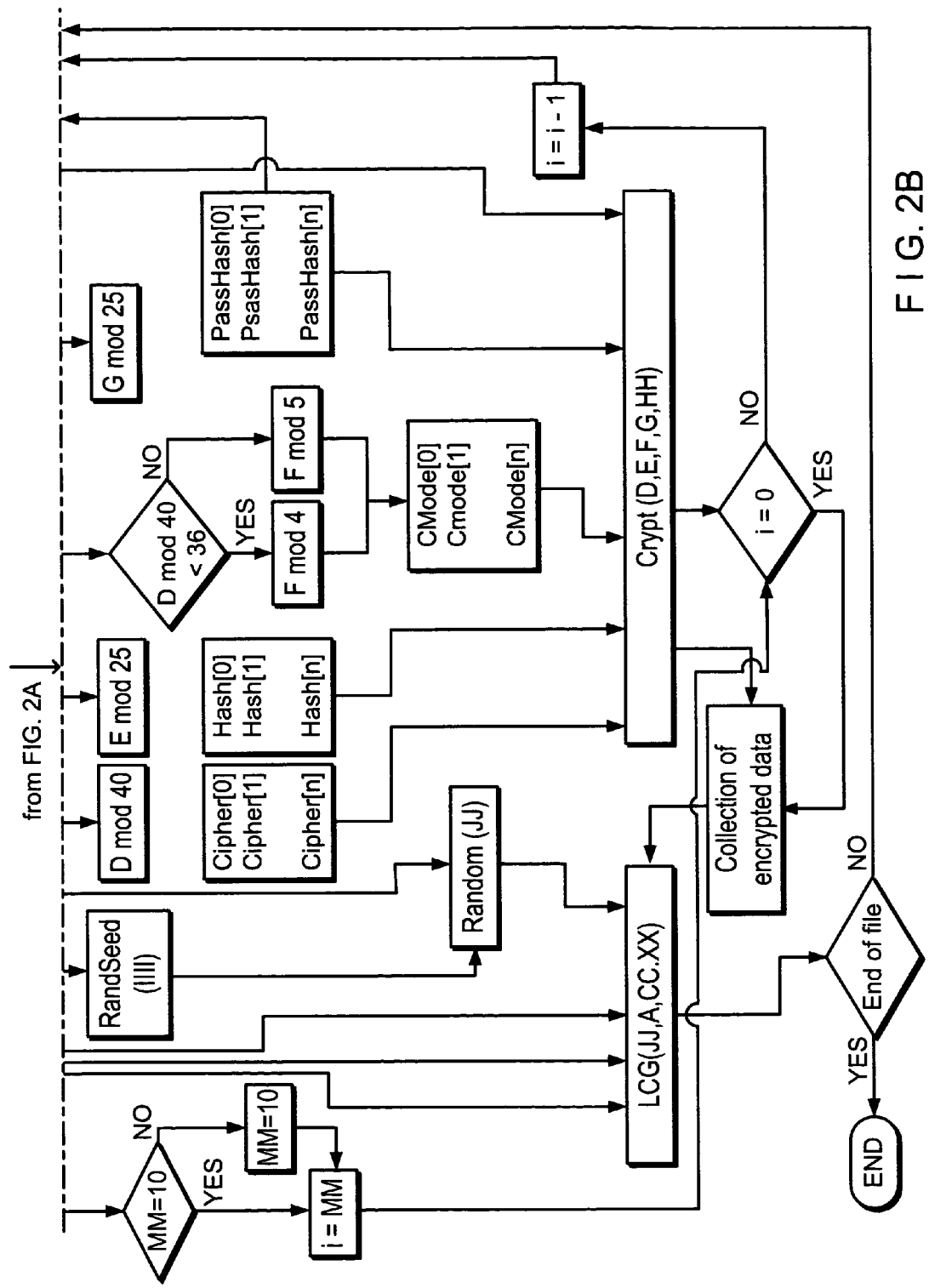

Referring now to FIGS. 1-3 (c) a method and system for a hybrid encryption and for generating keys, block size length, and selecting algorithms as well as other parameters is described. To simplify the discussion, standard block sizes and key sizes associated with symmetric algorithms will be used. The present disclosure employs multiple symmetric algorithms, variable block sizes, multiple hash functions, and different key lengths.

As shown in the general flow chart for the present disclosure of FIG. 1, the hybrid encryption process and system of the present disclosure includes:

A password or cryptographic key is provided and entered (step 1). The password or cryptographic key is placed in a key table (step 1). This value will be used to generate keys for encryption.)

The part of the value from the key table (step 2) is extracted (i.e. 56 bits), hashed (step 3) and the hash value is parsed into the following scheme shown in detail in FIG. 2 ,steps 35-45 where each letter signifies a byte).

MMACCXXDEFGHHIIIIJJ (for the hybrid algorithm any 152 bits of the hash output may be used, however, for the preferred embodiment, we will use the first 152 bits of the hash output steps 35-45 of FIG. 2), where:

MM: used to select number of blocks (for example, if MM=5, block size=128 bits, then 5x128 bits will be encrypted, executing 5 rounds with the same encryption algorithm)
    In a preferred non-limiting illustrative embodiment (illustrative in the detailed flowchart of FIG. 2), the value of M will be limited to values between 10 and 5,461
A: multiplier used for block scrambling in Linear Congruential Generator (LCG). A linear congruential generator (LCG) is one of the oldest and best known pseudorandom number generators.
CC: used for LCG
XX: used for LCG
D: used to select the encryption algorithm.
E: used to select the hashing algorithm
F: used to select the mode of operation
G: used to select the password hashing algorithm
HH: length (in bytes) of a single block, value can range from 1 to 5461, the preferred embodiment will use standard block sizes
IIII: random number generator seed
JJ: used for LCG The parsed values are used to set up the encryption parameters for encrypting a block of data, including selection of algorithm, block size, and mode of operation.

One block of data is encrypted using the generated key values, the encrypting key consisting of the first sequential bits of the resultant hash value as described above, that is, 112 bits for TDES, 128 or 256 bits for AES, etc.

If additional data needs to be encrypted, a new key value is generated using a determined hash function which generates a new key and a new value for: MMACCXXDEF-GHHIIIIJJ, the previous value was used only once The new key value contains i.e. new selections for encryption algorithm, block size, key size, mode of operation, and random number generator seeds One block of data is encrypted using the new generated key values and parameters for encryption The new key value replaces the previous key value in the table.

This process (key generation, parameter selection, encryption) proceeds until the end of file is reached and no additional data needs to be encrypted This hybrid encryption system and method as illustrated in FIG. 1 and described above modifies all the encryption parameters for each round, thereby increasing the difficulty for recovering plaintext information without use of the corresponding decryption process.

The following are the most important advantages of the present disclosure.

Each block of information is encrypted with a different algorithm

Each block may use a different mode of operation

Each block may vary in size

Different hashing functions are used to generate keys

System allows for use of asymmetric and stream ciphers

None of the existing encryption systems possess this set of properties.

FIG. 2 illustrates a detailed embodiment of the present disclosure showing the operation of a hybrid algorithm.

In the embodiment of FIG. 2 it will be assumed that a 65000 bit key 30 is be used (it could be generated by various methods, provided by third party or instead of a key a simple password could be used) (see also FIG. 1 step 1).

In FIG. 2, the step 30, i=0 (variable "i" is a counter that tells algorithm how many rounds an algorithm should run before "i" will again be reset to "0" (zero).

When an algorithm starts, counter "i" is always set to "0" (zero) (step 30). There may be other instances when "i" is set to "0" (zero) (such as in FIG.2, steps 34, 51 and 54).

A 65000 bit key is divided into 32 bytes blocks and entered into a table (step 31).

Keys in the table are being subjected to mathematical operations (for a purpose of this example it could be XOR) (step 32).

The first 32 bytes block from the table is taken and hashed as shown in step 33 and also in FIG. 1, step 3.

A result of that hashing may be for example 256 bits.

An algorithm checks if i=0 (step 34).

Since when an algorithm starts counter "i" is always 0 then it is YES and the hash value is parsed into a following scheme (each letter signifies a byte) MMACCXXDEFGHIIIIJJ (for the hybrid algorithm any 152 bits of the hash output may be used, however, for the preferred embodiment, the first 152 bits of the hash output will be used), where:

MM: is used to select number of blocks (for example, if MM=5, block size=128 bits, then 5x128 bits will be encrypted, executing 5 rounds with the same encryption algorithm) (see step 35).

In the preferred embodiment of FIG. 2, the value of M will be limited to values between 10 and 5,461.

A multiplier is used for block scrambling in a Linear Congruential Generator (LCG) (step 36).

A CC increment—is the parameter used in LCG algorithm (step 37).

XX is the Seed—parameter used in LCG algorithm (step 38).

D is used to select the encryption algorithm (step 39).

E is used to select the hashing algorithm (step 40).

F is used to select the mode of operation (step 41).

G is used to select the password hashing algorithm (step 42).

HH is the (in bytes) of a single block, the value can range from 1 to 5461, in the preferred embodiment of FIG. 2 standard block sizes will be used (step 43).

IIII is the number generator seed (step 44).

JJ is the Modulus- parameter used in LCG algorithm (step 45).

The parsed values are used to set up the encryption parameters for encrypting a block of data, including selection of algorithm, block size, and mode of operation as well as value of counter "i" and parameters for (LCG)

Figure 3B:
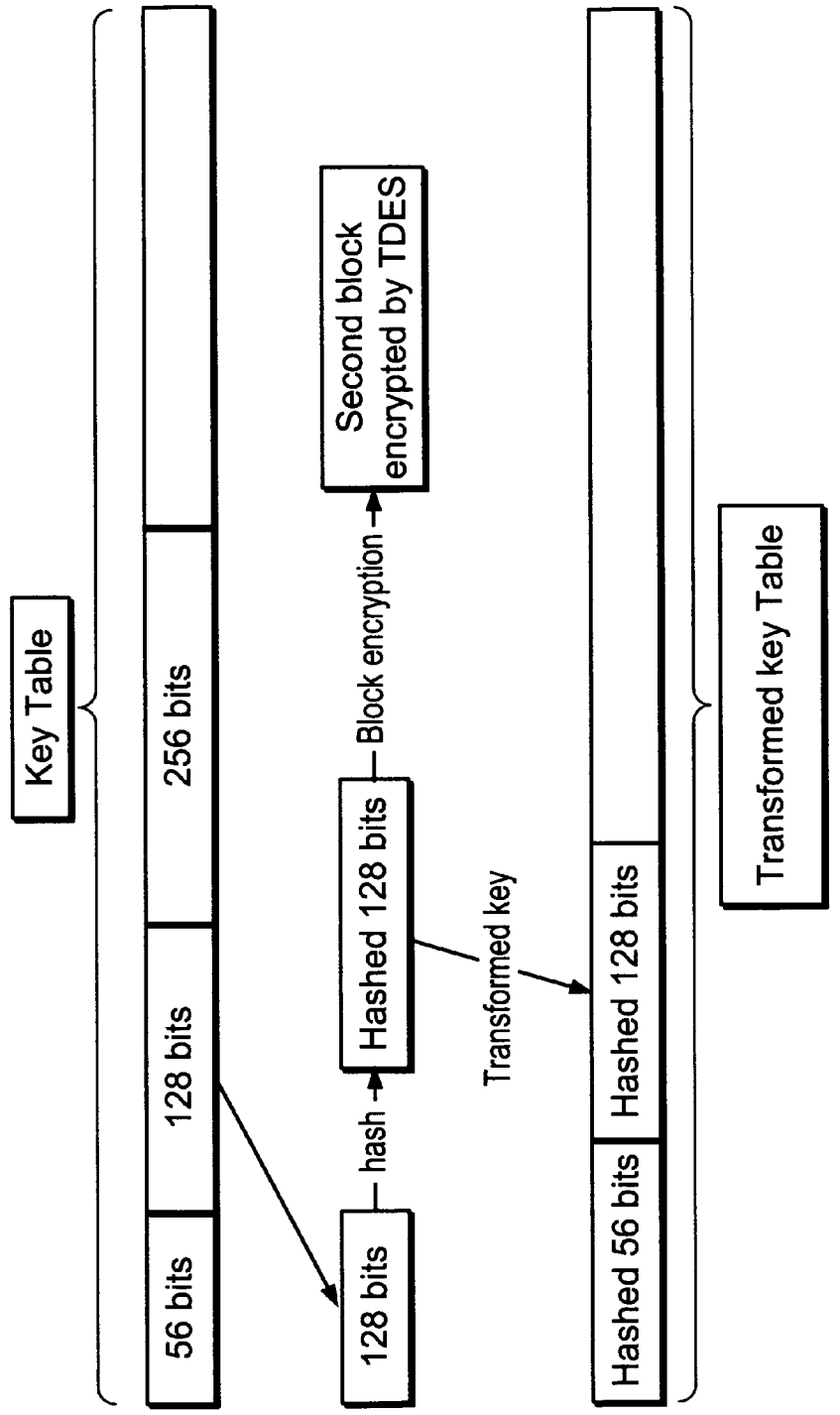

In steps 42 and 50 algorithm chooses a new password for hashing algorithm 33 (also FIGS. 3a, 3b and 3c.)

In reference to FIG. 2 the step 33 password used for hash algorithm is never the same.

The hashed key is re-entered back into a table creating(for the sake of an example, it will be referred, to as a transformed key)a new set of keys. When an original keys are used which occurs when the algorithm processed all 65000 bits, then a new transformed key takes its place and on and on FIG. 3a step 18-19, FIG. 3b step 24 and FIG. 3c step 29.

After data is collected and encrypted 52 algorithm checks the counter "i" for its value.

If value is "0" (zero) 54 YES then encrypted data is collected 55 and passed over to LCG (Linear Congruential Generator) and after this algorithm checks whether or not this is an EOF 56 and if YES then algorithm stops and if it is NO then algorithm goes back to step 31

Again when data is collected and encrypted 52 and "i" is not equal 0 (zero) NO algorithm sends data to be collected 55 but does not pass it over to LCG, instead it continues to 31. The only instance when algorithm sends data to be collected 55 and then passed over to LCG 53 is when i=0 54 (YES).

IT is important to note that assuming that the full cycle starts at step 30 in this example of FIG. 2 only cycles marked evenly (cycle 2, cycle 4, cycle 6, cycle 8 . . . ) at step 34 (when i=0) pareses into a schema DEFGHHIIIIJJ as if "i" were not 0 (zero) otherwise an algorithm follows its normal parsing process according to schema MMACCXXDEFGHIIIIJJ (cycles 1,3,5,7 etc).

This method and system of hybrid encryption as illustrated in

FIG. 1 and described above modifies all the encryption parameters for each round, thereby increasing the difficulty for recovering plaintext information without use of the corresponding decryption process.

While certain embodiments have been shown and described, it is distinctly understood that the invention is not limited thereto but may be otherwise embodied within the scope of the appended claims.

What is claimed:

1. An encryption device, comprising:
a device including a symmetric block cipher, adapted to receive a set of encryption round function variables and a selected one of a set of encryption algorithms for use by said symmetric block cipher to encrypt blocks of information, said selected one of said set of encryption algorithms changing to another one of said set of encryption algorithms for each round function so that said symmetric block cipher generates and uses block sizes of any length for said device, wherein the set of encryption algorithms are symmetric algorithms.

2. The device according to claim 1 wherein said device uses standard block sizes and key sizes for a respective algorithm that is being used for each round function.

3. The device according to claim 1 wherein each block of information is encrypted with a different algorithm.

4. The device according to claim 1 wherein each block of information may use a different mode of operation.

5. The device according to claim 1 wherein each block of information may vary in size.

6. The device according to claim 1 wherein different hashing functions are used to generate keys.

7. The device according to claim 1 wherein use of asymmetric and stream ciphers is permitted.

8. A method of utilizing a symmetric block cipher for a device, the method comprising:
   providing a set of encryption round function variables and a selected one of a set of encryption algorithms for use by a device including a symmetric block cipher;
   changing block sizes for said selected encryption algorithm for each round function, changing key length for said selected encryption algorithm for each round function, so that said symmetric block cipher generates changes for said selected encryption algorithm, the block size and the key length for each round function for said device,
   wherein the set of encryption algorithms are symmetric algorithms.

9. The method according to claim 8 wherein each block of information is encrypted with a different algorithm.

10. The method according to claim 8 wherein each block of information may use a different mode of operation.

11. The method according to claim 8 wherein each block of information may vary in size.

12. The method according to claim 8 wherein different hashing functions are used to generate keys.

13. The method according to claim 8 wherein use of asymmetric and stream ciphers is permitted.

14. The method according to claim 8 further comprising the step of using standard block sizes and key sizes for each respective algorithm that is being used for each round function.

\* \* \* \* \*